United States Patent [19]

Dahlgren

[11] Patent Number: 5,431,417
[45] Date of Patent: Jul. 11, 1995

[54] SEAL RING AND USE OF THIS RING

[75] Inventor: Finn Dahlgren, Svelvik, Norway

[73] Assignee: Steelproducts Offshore AS, Drammen, Norway

[21] Appl. No.: 949,249

[22] PCT Filed: May 24, 1991

[86] PCT No.: PCT/NO91/00079

§ 371 Date: Jan. 6, 1993

§ 102(e) Date: Jan. 6, 1993

[87] PCT Pub. No.: WO91/19128

PCT Pub. Date: Dec. 12, 1991

[30] Foreign Application Priority Data

May 25, 1990 [NO] Norway ................. 902332

[51] Int. Cl.[6] .................................................. F16J 15/06
[52] U.S. Cl. ..................... 277/207 A; 277/167.5; 277/171
[58] Field of Search ........... 277/170, 171, 180, 207 A, 277/DIG. 6, 167.5

[56] References Cited

U.S. PATENT DOCUMENTS

| | | | |
|---|---|---|---|
| 1,567,813 | 12/1925 | Oleson | 277/170 |
| 1,873,855 | 8/1932 | Wilson | |
| 2,299,813 | 10/1942 | Franks | 277/DIG. 6 |
| 2,491,599 | 12/1949 | Allen | 285/22 |
| 2,753,197 | 7/1956 | Loeffler | 285/336 |
| 3,290,047 | 12/1966 | Mayer | 277/2 |
| 3,820,830 | 6/1974 | Dryer | 285/336 |
| 4,168,852 | 9/1979 | Ahlstone | 277/180 X |
| 4,410,186 | 10/1983 | Pierce, Jr. | 277/167.5 X |
| 4,470,609 | 9/1984 | Poe | 277/207 A X |
| 4,747,624 | 5/1988 | Faber et al. | 277/207 A X |

FOREIGN PATENT DOCUMENTS 2239314  8/1972  Germany .

OTHER PUBLICATIONS

Webster's New World Dictionary, Third College Edition ©1988, pp. 37 and 286, in part.

Primary Examiner—William A. Cuchlinski, Jr.
Assistant Examiner—John L. Beres
Attorney, Agent, or Firm—Burns, Doane, Swecker & Mathis

[57] ABSTRACT

A sealing ring is provided for mounting in a sealing groove in each pipe-joint half of a pipe joint for high pressure use. The sealing ring comprises two joined bodies having bevelled outer sections. The sealing ring is configured such that the joined bodies are compressed toward each other upon insertion into the sealing groove of each pipe-joint half. The two joined bodies are separated by an integrated distancing piece which has an aperture that extends therethrough and is substantially perpendicular to the middle plane of the sealing ring.

9 Claims, 4 Drawing Sheets

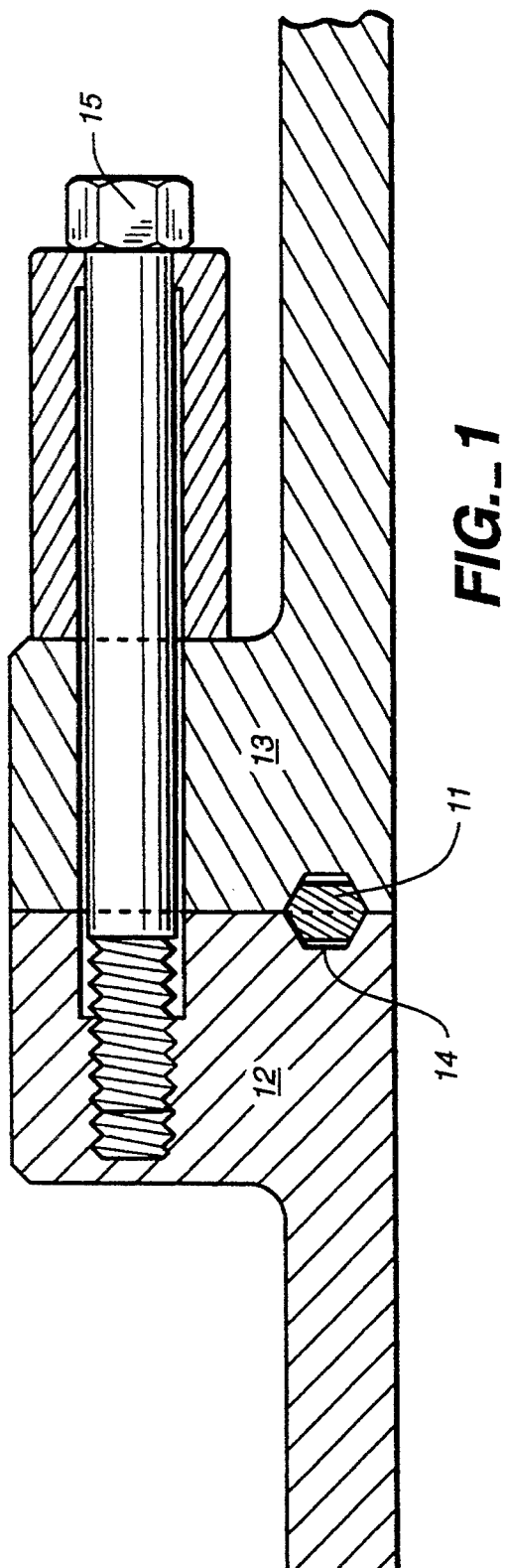
FIG._1
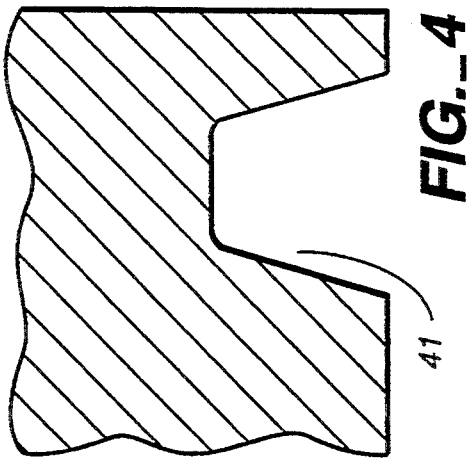
FIG._4
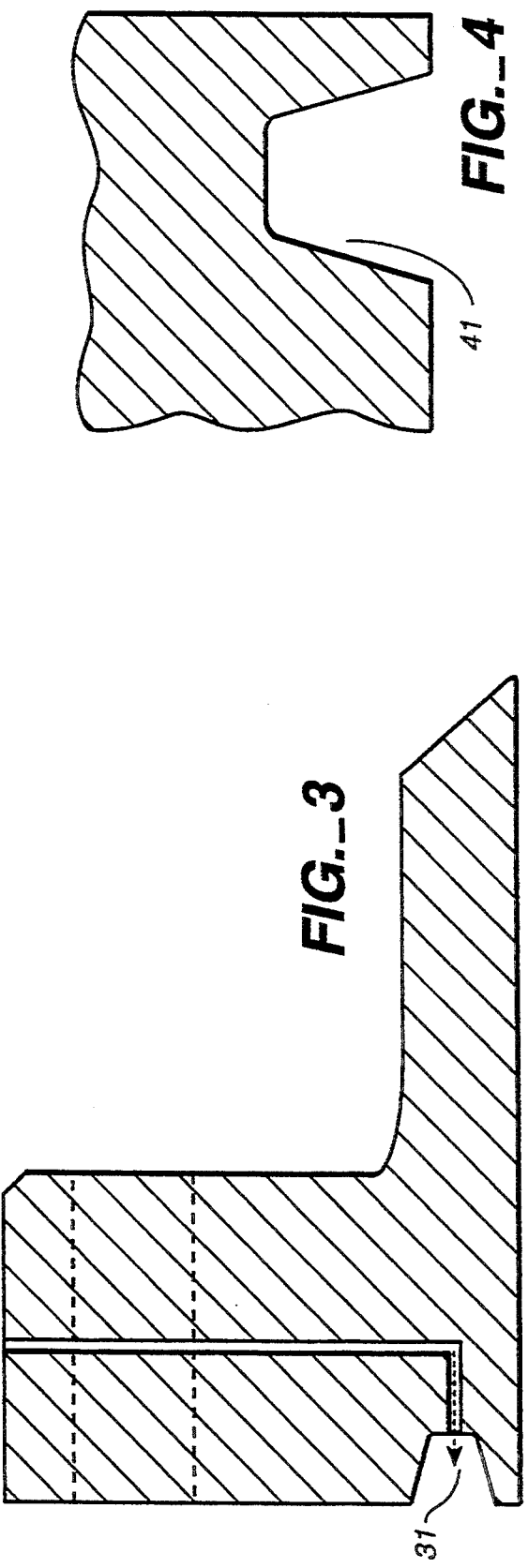
FIG._3

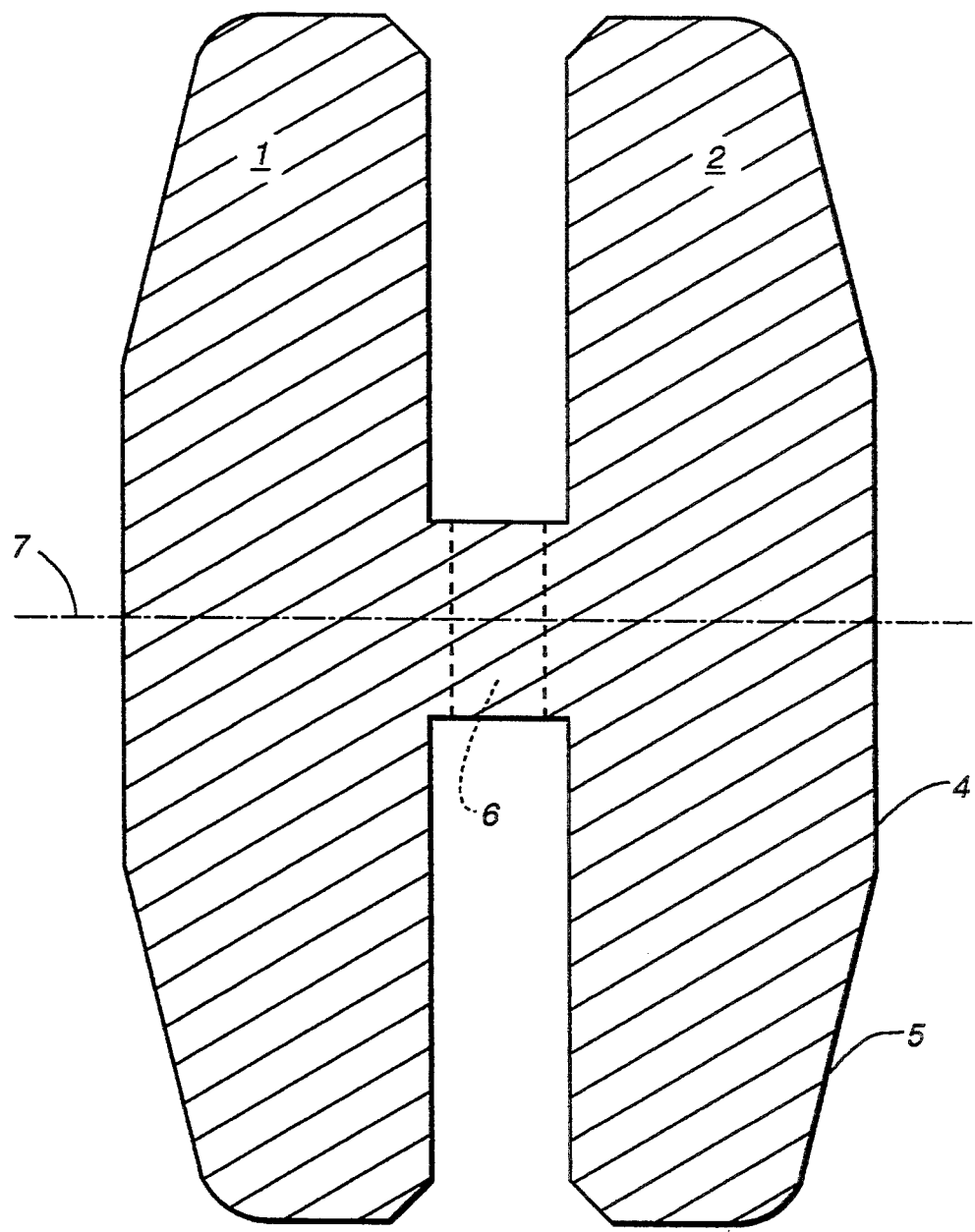
FIG._2

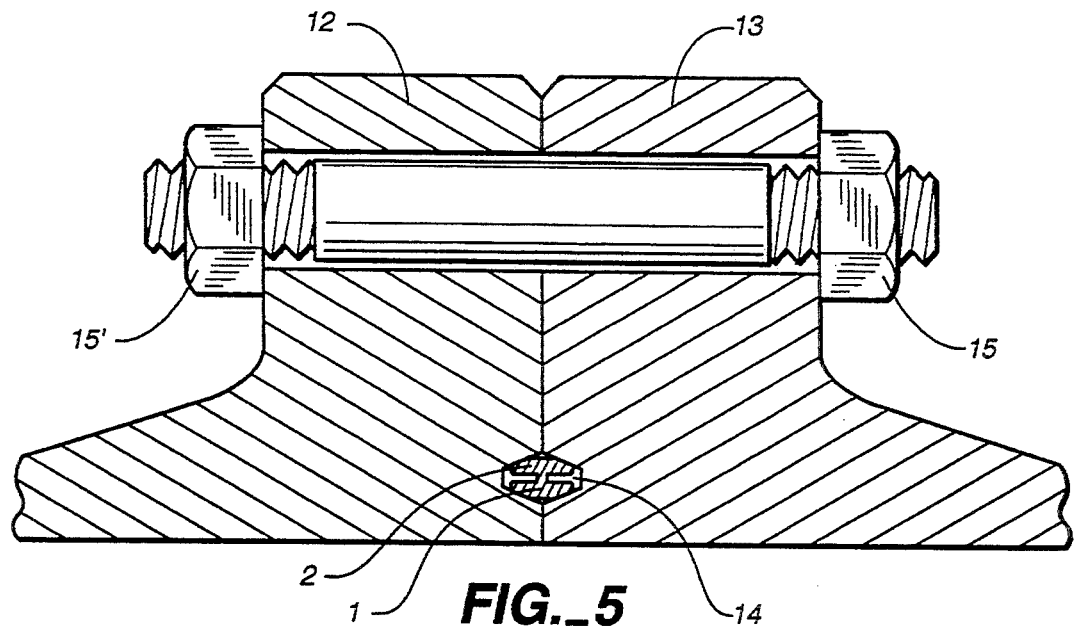
FIG._5
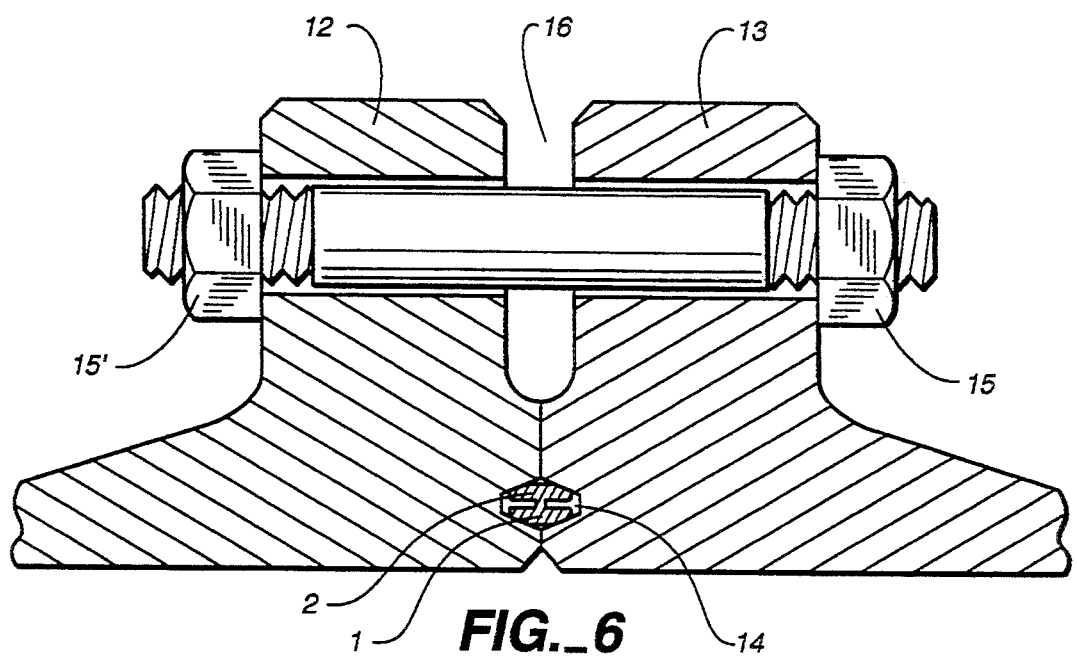
FIG._6

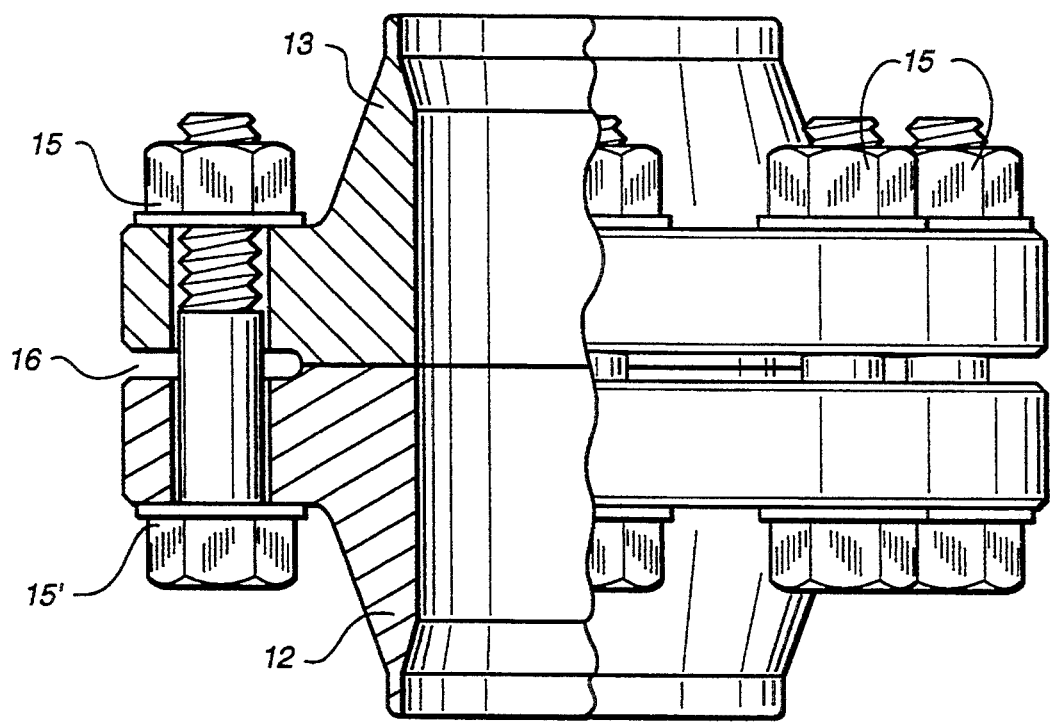
FIG._7
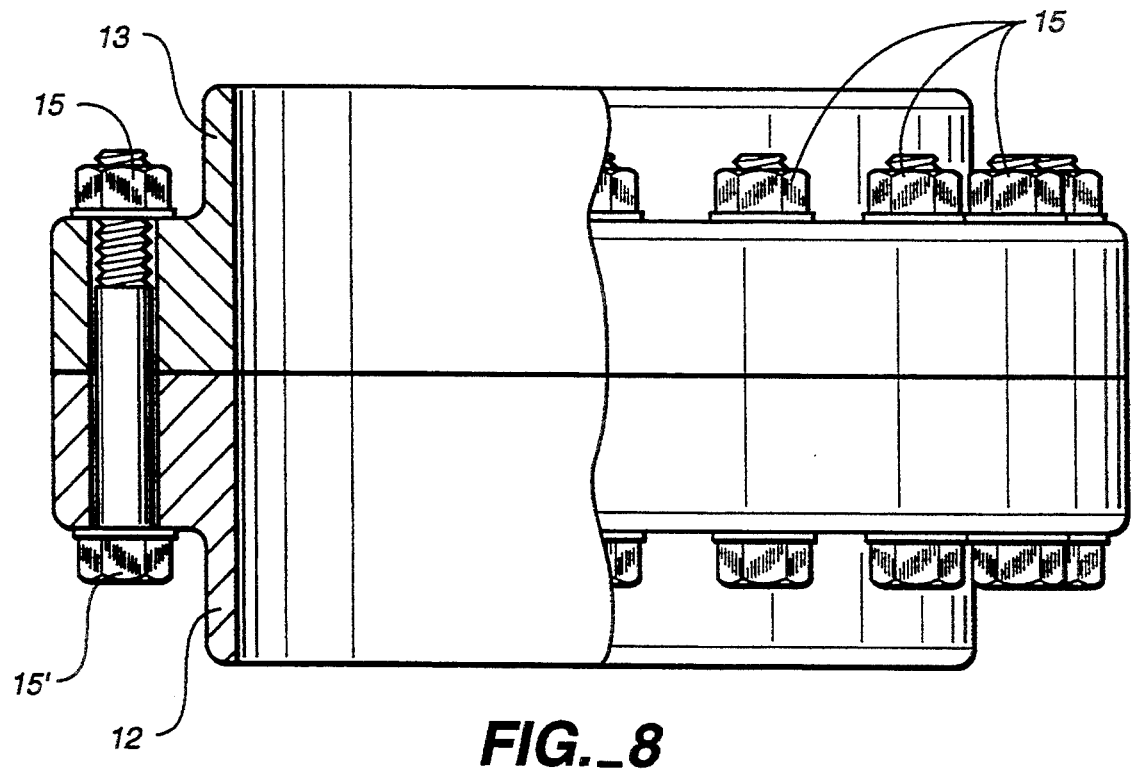
FIG._8

SEAL RING AND USE OF THIS RING

FIELD OF THE INVENTION

The present invention relates to a seal ring for conduit flanges and -joints which have to withstand high pressure and possibly thermal and mechanical loads. A special field of application for this kind of seals is found in risers in the oil industry.

BACKGROUND OF THE INVENTION

In high pressure technology there are several known types of seal rings for conduit joints. Common to all of these is the fact that they are made of compact and non-compressible material like metal and metal alloys since other types of material will not be as strong as required in high pressure technology.

The disadvantage of using such conventional seal rings and gaskets, is the fact that the joints in the pipeline typically are exposed to thermal work in the material as well as mechanical stress forces resulting in a joint which after some time will start leaking. Furthermore, when using this kind of joints and gaskets it has so far not been possible to check the seal capacity of such conduit joints, especially not during assembly, without resorting to test methods which are both demanding and expensive. Another disadvantage of conventional types of gaskets is the fact that they provide flexibility in one direction only, which is insufficient in order to ensure proper seal capacity.

A purpose of the present invention is thus to provide a seal ring avoiding the aforementioned problems in connection with work in the material in the area around the conduit joints, whilst testing of the conduit joints in joined pipelines is enabled, the testing being carried out with full pressure in the pipeline.

BRIEF DESCRIPTION OF THE DRAWING

In the following the invention will be explained referring to the attached drawings in which:

FIG. 1 is a view of a conventional conduit joint with a flange,

FIG. 2 is a view of an embodiment of a seal ring according to the present invention, FIG. 3 is a view of one half of such a flange with a marked entrance for a pressure probe for the testing of the seal performances of the flange and the conduit joint when exposed to high pressure.

FIG. 4 is a section of a groove in a seal ring according to the invention.

FIG. 5 illustrates another type of flange assembled with a seal according to the invention.

FIG. 6 illustrates a third type of flange assembled with a seal according to the invention.

FIG. 7 and 8 illustrate in section two types of flanges assembled around a conduit.

DESCRIPTION OF THE PREFERRED EMBODIMENTS

Today it is both common and necessary to incorporate a seal in conduit joining flanges to ensure a leakage proof joint. As explained above it is however typical that such seals are shaped so as to achieve an accurate fitting in the corresponding groove in the flange, and further that they are made of compact material, causing the seal to start leaking after some time because of mechanical and thermal wear and tear as well as work from the material surrounding the joint.

In addition it has earlier been necessary to carry out pressure tests on such joints and gaskets after complete assembly of the pipelines, and it has not been possible to do these tests with a pressure below or above operation pressure.

According to the invention it has been found to be advantageous to shape a seal like this so as to enable an individual fitting in the flange groove, and particularly with flexibility in at least two directions.

In order to have the flange seal according to the invention function accordingly, the seal is shaped so as to include at least two confronting seal halves 1,2, which is distanced by a web 3 between the halves 1,2. Because of the web 3 the seal will have a certain resilient characteristic in that the halves 1,2 are forced against each other when mounted in a seal groove 31,41. Because of this it is very important that the seal flange is fitted relative to the groove 31,41 so that the halves 1,2 are forced against each other when mounted, e.g. that the seal will rest against the material of the groove 31,41 when the seal is half way down in the groove. By giving the seal halves 1,2 a preferentially conic region in the end/peripheral region of the seal, this kind of fitting may be ensured. The groove may further be given a preferentially inward conic shape as is shown in FIG. 3 and 4.

To ensure good seal performances of the seal according to the invention, it is preferred that the cone angle between the outer plane surface 4 of the seal and the sloping part 5 of the seal is in the range 13,5°±0,5°, although other values of this angle may be applied. It is preferred that the degree of deformation resulting from the compression of the seal in the conic groove 31,41 is in the range 0,041±0,01, i.e. with an opening of the groove equal to 19,533 mm the compression of the seal is 0,8 mm±0,2 mm. This is however only a preferred ratio, and other ratios will be available to the expert taking into consideration the intended operation of the seal as well as the characteristics of the material of the seal.

As mentioned above the present type of seal is intended for high pressure pipelines, e.g. pipelines with a pressure of 75 bar and above, A pressure of this magnitude is typically present in risers on oil platforms, but it may also be found in other fields like for instance in process technology or in energy technology like nuclear power plants. With respect to process technology it will also be required to make the seals according to the invention from a material resistant to the medium carried in the pipeline. The person skilled in the art will have to choose the material depending on the particular case. Examples of materials suitable for most fields of application are metal and metal alloys like stainless steel, carbon steel, low-alloy steel, acid resistant steel or other metal alloys.

It will also be possible to use other types of material for the seal according to the invention, like ceramic material and/or composite material assuming that they have sufficient tension and sealing qualities corresponding to those demonstrated by the aforementioned types of metal. The person skilled in the art may naturally decide what materials to use.

It will also be possible to shape a seal according to the invention differently from what is shown in FIG. 2, for instance with a web 3 which is either wider or more narrow than the one illustrated, bearing in mind that the resilient qualities of the seal parts 1,2 have to be maintained. It will thus be less preferable to have the width of the web 3 pass the transition between the plane section 4 and the conic section 5. It is also obvious that the web 3 should not be to narrow, and an example of the ratio between the total width of the seal and the width of the web is 6,4, i.e. the total width may have a value equal to 25,4 mm and the width of the web is then 4 mm. The values above relates to seals where the web is positioned around a centre line 7 of the seal, but it may also be shifted in one or the other direction with respect to this centre line.

Similarly the groove 31,41 in the flange part will have to have a depth which is at least equal to half of the total length of the seal, preferably somewhat larger so as to achieve the compression effect mentioned above when the seal according to the invention is assembled. This is suggested in FIG. 5 and 6, referring to the gap 14 between the material in the flange halves 12 and 13 and the seal 11.

Beside mechanical and thermal loads, the seal according to the invention will also be able to absorb vibrations from the pipeline and the conduit joints when shaped and mounted as explained.

To ensure that the flange halves 12 and 13 are sufficiently secured to each other to form a sufficiently strong connection, the halves may for instance be screwed together by bolts 15,15', like shown in FIG. 1, 5, 6, 7 and 8. This securing may be carried out in a conventional way, but also including a seal according to the present invention to ensure the aforementioned seal tightness.

FIG. 6 and 7 illustrate an embodiment of a conventional flange with a seal according to the present invention. To ensure sufficient compression of the flange halves 12 and 13, the halves are shaped so that a compression groove 16 is formed between the halves 12 and 13, resulting in an optimal compression when the nuts 15,15' are tightened.

The seal tightness explained above is a result of the fact that the seal according to the invention has at least one groove between the seal halves 1 and 2. As an example a seal ring with two grooves is illustrated in FIG. 2, but it is obvious that one such groove may be applied, depending on the field of use. It is also obvious that the seal ring may be applied in horizontal as well as vertical conduit joints, and also in conduit joints with any arbitrary slope.

One particularly preferred embodiment of the seal ring according to the invention includes at least one penetrating hole 6 through the web 3. The purpose of the hole 6 is to provide the possibility of performing a pressure test on the tightness of the seal and thereby the conduit joint during mounting, with a pressure at least equal to the total operation pressure. As explained above, previously this has not been possible since the seals have been made of compact material, and testing of the seal tightness has consequently only been possible by performing pressure tests from the inner surface of the pipeline, and these tests had to be carried out with a pressure substantially less than the operation pressure. The dimension of the hole 6 is not critical, but it has to be big enough to transport fluids with pressure, but on the other hand not so big that it weakens the material in the web 3. An example of an applicable dimension of the hole is ⅔ of the total width of the web 3, but other dimensions may also be used.

The advantages of having the possibility of testing conduit joints particularly in risers during mounting and with total operation pressure, are obvious to the person skilled in the art.

The method for performing a pressure test of the conduit joints includes the arrangement of a nozzle in a corresponding hole, indicated by an arrow in FIG. 3, so that the nozzle faces and ends at the bottom of the groove 31. The hole may for instance be drilled into the flange. In this way will it be possible to pressurize the groove 31 with an arbitrary pressure without having to pressurize the pipe line at all. Consequently any conduit joint may be pressure-tested separately. This positioning of a relief hole will not have a negative influence on the flange, and it may be plugged after a possible removal of the nozzle. The size of the hole may for instance be 3,2 mm, but other sizes are available to the person skilled in the art and will not limit the inventive concept of the method for a separate pressure testing of the mounted flanges and seals.

In order to pressure test the overall seal tightness, it is important that a penetrating hole 6 is present in the web 3 so that the medium applied in the testing of the seal tightness has access to both sides of the seal in those cases where a seal with a shape like the one illustrated in FIG. 2 is used.

The medium applied in the pressure test may be a fluid, for instance a fluid corresponding to the one that will be present either inside of or outside of the pipeline during operation. It will however be possible to use other types of media in the pressure testing of the conduit joint.

The present invention has been explained above referring to particular embodiments of the seal ring, but this will not limit the scope the invention, as will be seen from the subsequent claims.

What is claimed is:

1. A sealing ring for flange face to flange face mating of pipe joints in high pressure pipes for mounting completely in a sealing groove consisting of a flange groove in each pipe-joint half, said sealing ring comprising:
   two mutually joined bodies with bevelled outer sections wherein one-half of the sealing ring length is no greater than the depth of the sealing groove in each pipe-joint half, the joined bodies of the sealing ring being mutually connected and separated from each other with an integrated distancing piece and configured such that said joined bodies are compressed toward each other upon insertion into the sealing groove;
   said distancing piece comprising at least one penetrating aperture that extends substantially perpendicularly to the middle plane of the sealing ring.

2. Sealing ring according to claim 1, wherein the dimension of the penetrating aperture is about ⅔ of the total width of the distancing piece.

3. Sealing ring according to claim 1 wherein the sealing ring is a metal or a metal alloy.

4. Sealing ring according to claim 1 wherein the sealing ring is a ceramic or a composite material.

5. A sealing ring according to claim 1 wherein the sealing ring is adapted for pressure-tight joining of pipe elements in risers.

6. A sealing ring according to claim 2 wherein the sealing ring is a metal or a metal alloy.

7. A sealing ring according to claim 2 wherein the sealing ring is a ceramic or a composite material.

8. A sealing ring according to claim 2 wherein the sealing ring is adapted for pressure-tight joining of pipe elements in risers.

9. A sealing ring according to claim 3 wherein the sealing ring is adapted for pressure-tight joining of pipe elements in risers.

* * * * *